(12) United States Patent
Kawanishi et al.

(10) Patent No.: US 9,124,747 B2
(45) Date of Patent: Sep. 1, 2015

(54) IMAGE READING DEVICE AND IMAGE READING METHOD

(71) Applicant: CANON KABUSHIKI KAISHA, Tokyo (JP)

(72) Inventors: Masahiro Kawanishi, Yokohama (JP); Hikaru Watanabe, Yokohoma (JP); Haruo Ishizuka, Ichikawa (JP); Takashi Awai, Chiba (JP); Toshihide Wada, Yokohama (JP); Makoto Takemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/338,901

(22) Filed: Jul. 23, 2014

(65) Prior Publication Data

US 2015/0055198 A1    Feb. 26, 2015

(30) Foreign Application Priority Data

Aug. 23, 2013    (JP) ................. 2013-173385

(51) Int. Cl.
*H04N 1/04* (2006.01)
*H04N 1/00* (2006.01)
*H04N 1/10* (2006.01)

(52) U.S. Cl.
CPC ......... *H04N 1/00819* (2013.01); *H04N 1/1013* (2013.01)

(58) Field of Classification Search
CPC ... H04N 1/00572; H04N 1/203; H04N 1/193; H04N 1/0464; H04N 1/121; H04N 1/2032; H04N 1/00087; H04N 1/1017; H04N 1/1026; H04N 1/1043; H04N 1/1048; H04N 1/1061; H04N 1/4076; H04N 2201/0081
USPC ......... 358/496, 497, 498, 406, 461, 465, 474, 358/486, 504
See application file for complete search history.

(56) References Cited

U.S. PATENT DOCUMENTS

| | | | | |
|---|---|---|---|---|
| 4,739,414 A * | 4/1988 | Pryor et al. | ................... | 358/482 |
| 5,107,350 A * | 4/1992 | Omori | ........................... | 358/461 |
| 5,579,129 A * | 11/1996 | Iwata et al. | ................... | 358/474 |
| 5,970,181 A * | 10/1999 | Ohtsu | .......................... | 382/274 |
| 6,900,902 B1 * | 5/2005 | Tanaka | ........................ | 358/1.13 |
| 7,755,814 B2 * | 7/2010 | Tamai et al. | .................. | 358/497 |
| 7,969,622 B2 * | 6/2011 | Saika | ............................ | 358/475 |
| 8,054,510 B2 * | 11/2011 | Suzuki et al. | ................. | 358/461 |
| 8,164,808 B2 * | 4/2012 | Morikawa | ..................... | 358/518 |
| 8,427,719 B2 * | 4/2013 | Fujiwara | ....................... | 358/488 |

(Continued)

FOREIGN PATENT DOCUMENTS

JP    2004-349911 A    12/2004

*Primary Examiner* — Negussie Worku
(74) *Attorney, Agent, or Firm* — Fitzpatrick, Cella, Harper & Scinto

(57) ABSTRACT

An image reading device includes: a sensor unit; a first reading part at which the sensor unit reads a document through a first transparent member; a second reading part at which the sensor unit reads a document through a second transparent member different from the first transparent member; and a color reference, wherein measurement of the color reference is able to be performed through the first transparent member by the sensor unit for calibration for reading at the first reading part, and measurement of the color reference is able to be performed through the second transparent member by the sensor unit for calibration for reading at the second reading part.

16 Claims, 14 Drawing Sheets

(56) References Cited

U.S. PATENT DOCUMENTS

| | | | |
|---|---|---|---|
| 2004/0012815 A1* | 1/2004 | Fuchigami | 358/2.1 |
| 2005/0206978 A1* | 9/2005 | Sone | 358/516 |
| 2009/0033970 A1* | 2/2009 | Bray et al. | 358/1.13 |
| 2013/0003145 A1* | 1/2013 | Osakabe et al. | 358/497 |
| 2013/0258369 A1* | 10/2013 | Suzuki et al. | 358/1.9 |

* cited by examiner

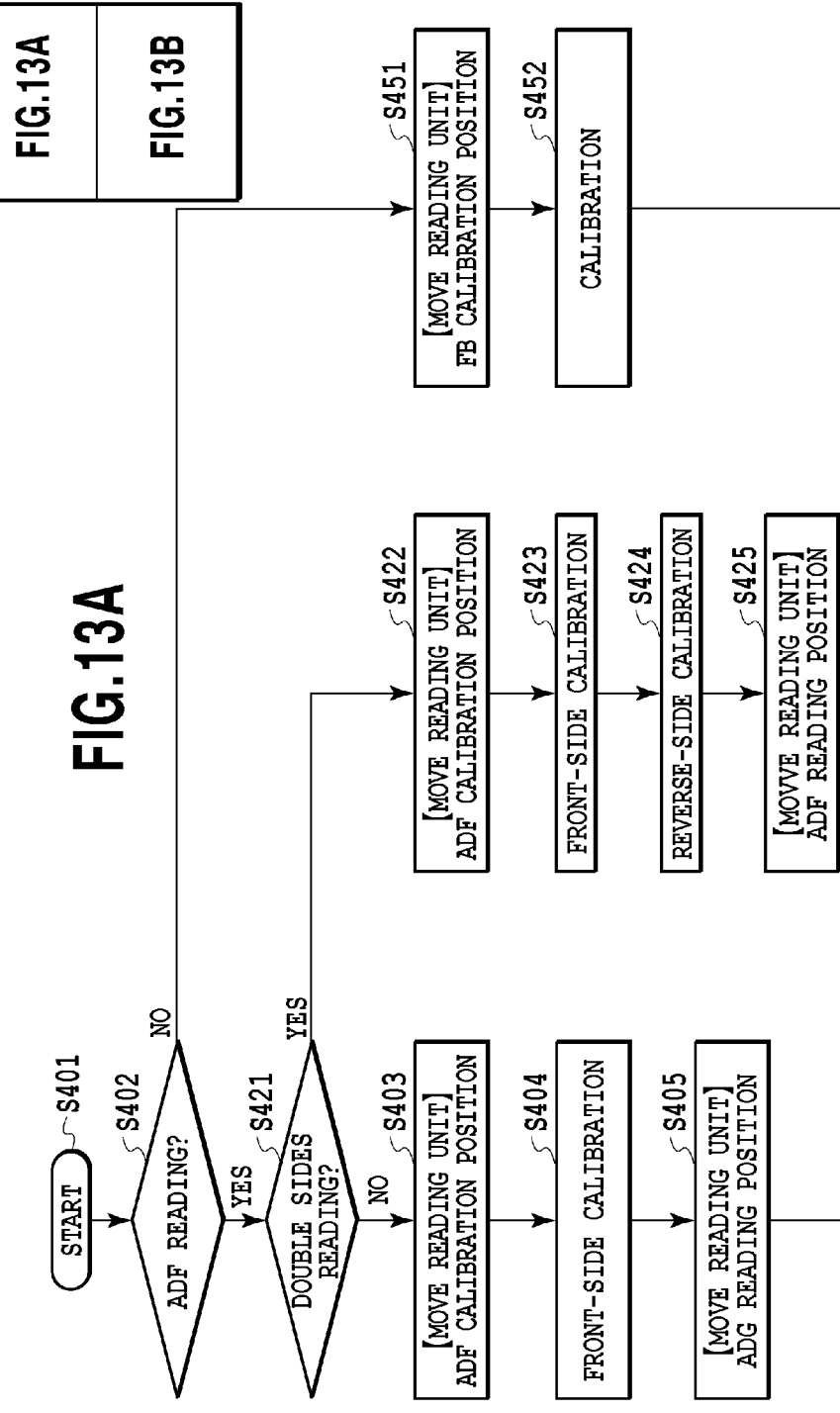

IMAGE READING DEVICE AND IMAGE READING METHOD

BACKGROUND OF THE INVENTION

1. Field of the Invention

This invention relates to an image reading device and an image reading method that can perform switching between reading of a document on a flatbed transparent member and reading of a document fed from an automatic document feeder device to read the document.

2. Description of the Related Art

For example, Japanese Patent Laid-Open No. 2004-349911 discloses an image reading device in which an FB (Flatbed) image reading device and an ADF (Automatic Document Feeder) device are integrated. Such an image reading device is capable of, after a document is laid on the FB transparent member (Flatbed transparent member), moving a reading unit in the sub scanning direction to read the stopped document. Hereinafter, such reading will be referred to as FB reading (Flatbed reading). Also the image reading device is capable of bringing the reading unit to a standstill to read, through a transparent member, a document fed from the ADF device and then delivering the read document to an exit unit. Hereinafter, such reading will be referred to as ADF reading (Automatic Document Feeder reading), and the transparent member used in the ADF reading will be referred to as an ADF transparent member (Automatic Document Feeder transparent member).

On the other hand, in the image reading device, calibration of the reading unit is performed to cause the reading unit to acquire image data with the fidelity of color tones to the document. Typically, the reading unit is operated to read a color reference sheet to acquire calibration data, and then calibration of the reading unit is performed on a basis of the acquired calibration data. In an image reading device capable of switching between the FB reading and the ADF reading, a common calibration process for the FB reading and the ADF reading is performed in most cases.

However, in the image reading device employing different members for the FB transparent member and the ADF transparent member as disclosed in Japanese Patent Laid-Open No. 2004-349911, the image reading device is incapable of achieving color correction suitable for each of the FB reading and the ADF reading by the common calibration process. For example, it is conceivable that, for the ADF reading, the color reference sheet may be read in a predetermined position and, based on this, calibration of the reading unit may be performed, and then for the FB reading, the result of this calibration may be applied to the reading unit without any change. However, in the case of performing such common calibration, the FB reading by the reading unit may possibly result in improper reading because of a difference in color tones of transmitted light between the FB transparent member and the ADF transparent member. For example, the FB transparent member may be formed of strongly bluish glass and the ADF transparent member may be formed of strongly yellowish resin. Further, even if the FB transparent member and the ADF transparent member are formed of the same material, their color tones may possibly differ from each other due to color-tone variations caused by big volume production and/or aged deterioration of the transparent member. In such a case, even if the same document is read by the FB reading and the ADF reading after the common calibration process has been executed, the read images thus obtained may differ in color tones.

SUMMARY OF THE INVENTION

It is an object of the present invention to provide an image reading device, a printing apparatus, and an image reading method that are capable of reducing the difference between color tones read in FB reading and in ADF reading.

To address the above-described problems, the present invention provides an image reading device that includes: a sensor unit; a first reading part at which the sensor unit reads a document through a first transparent member; a second reading part at which the sensor unit reads an document through a second transparent member different from the first transparent member; and a color reference, wherein measurement of the color reference is able to be performed through the first transparent member by the sensor unit for calibration for reading at the first reading part, and measurement of the color reference is able to be performed through the second transparent member by the sensor unit for calibration for reading at the second reading part.

The image reading device according to the present invention is capable of reducing the difference in color tones between the FB read image and the ADF read image at the time of reading the same document. Also, the read image reproduced with the fidelity of color tones to a target document can be obtained in each of the FB reading and the ADF reading.

Further features of the present invention will become apparent from the following description of exemplary embodiments with reference to the attached drawings.

BRIEF DESCRIPTION OF THE DRAWINGS

FIG. 13 is a diagram showing the relationship between FIGS. 13A and 13B;

FIGS. 13A and 13B are flowcharts of the processing of the image reading device according to the embodiment 2 of the present invention.

DESCRIPTION OF THE EMBODIMENTS

<Appearance of Image Reading Device>

Figure 1:
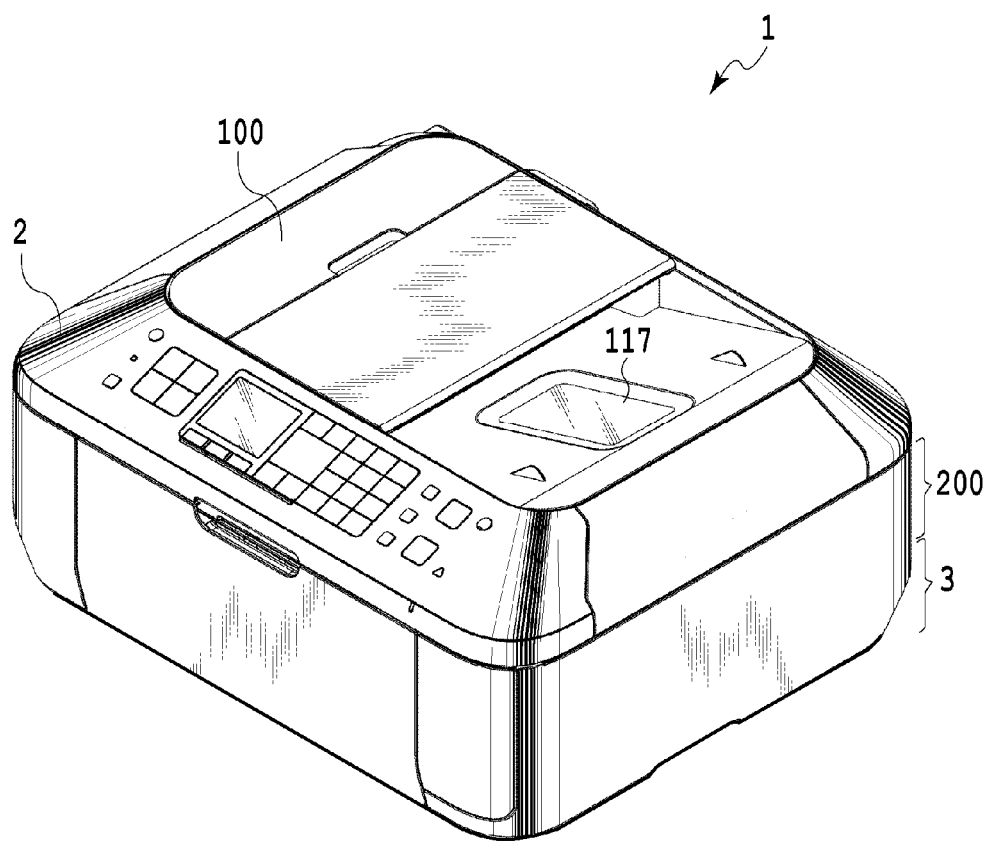
FIG. 1 is a perspective view illustrating an image reading device according to embodiment 1 of the present invention.

FIG. 1 is a perspective view of a printing apparatus including an image reading device according to embodiment 1 of the present invention. The printing apparatus 1 includes an automatic document feeder (ADF) 100, a flatbed scanner (FD scanner) 200, and an inkjet image printer 3. The present invention is not limited in its application to this form. For example, the above structure may not include the inkjet image printer 3. Hereinafter, a printing apparatus including an FB scanner and the like will also be called an image reading device. The image reading device 1 according to the embodiment 1 includes a control console 2 to accept user instructions. The control console 2 is provided with a start key for the user to make an instruction to start reading an document, a cursor key for selection between ADF reading (Automatic Document Feeder reading) and FB reading (Flatbed reading), and the like.

Figure 2:
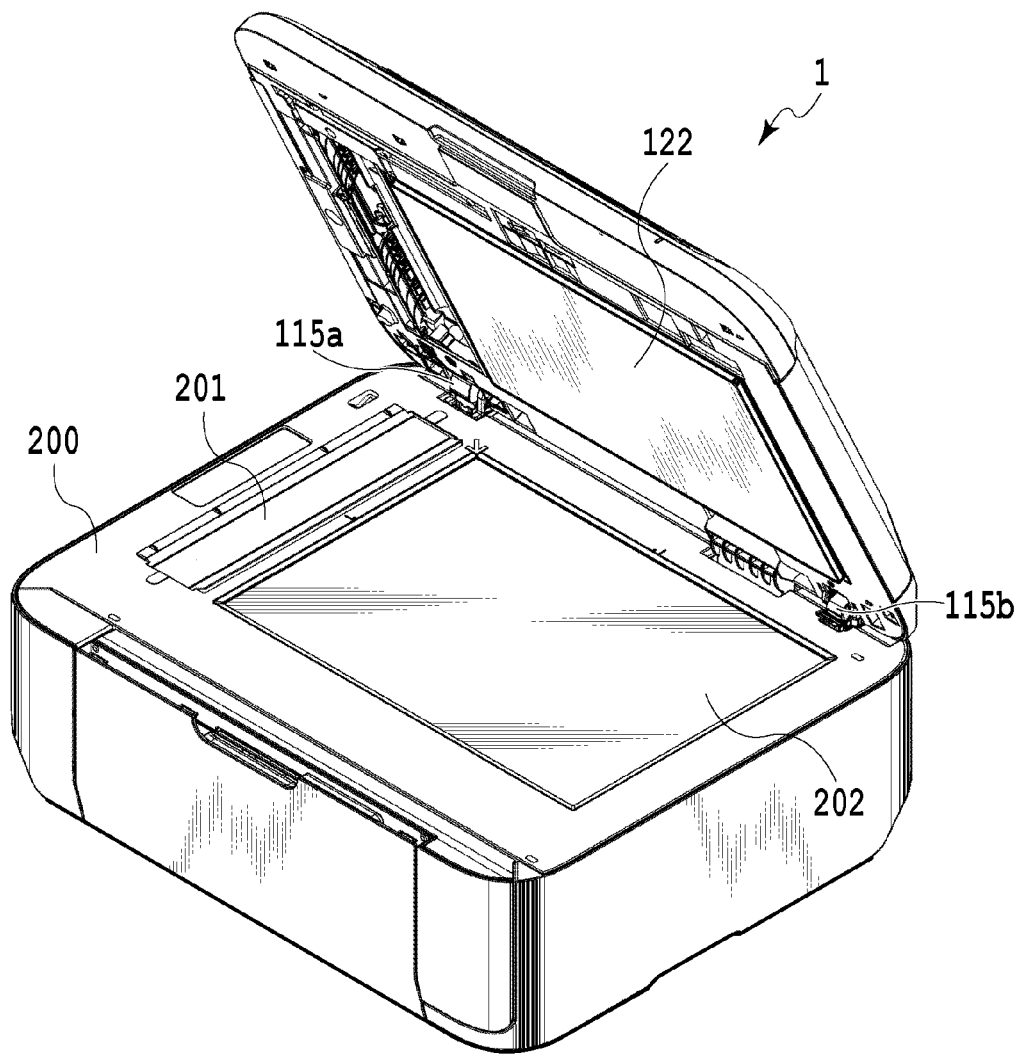
FIG. 2 is a perspective view of the image reading device according to the embodiment 1 of the present invention with an ADF being opened.

FIG. 2 is a perspective view of the printing apparatus according to the embodiment 1 with the ADF forming part of an openable cover member being opened. The ADF 100 is mounted above the FB scanner 200 through left and right hinges 115a, 115b to be allowed to turn about its one end as a rotation axis for opening/closing.

Figure 3:
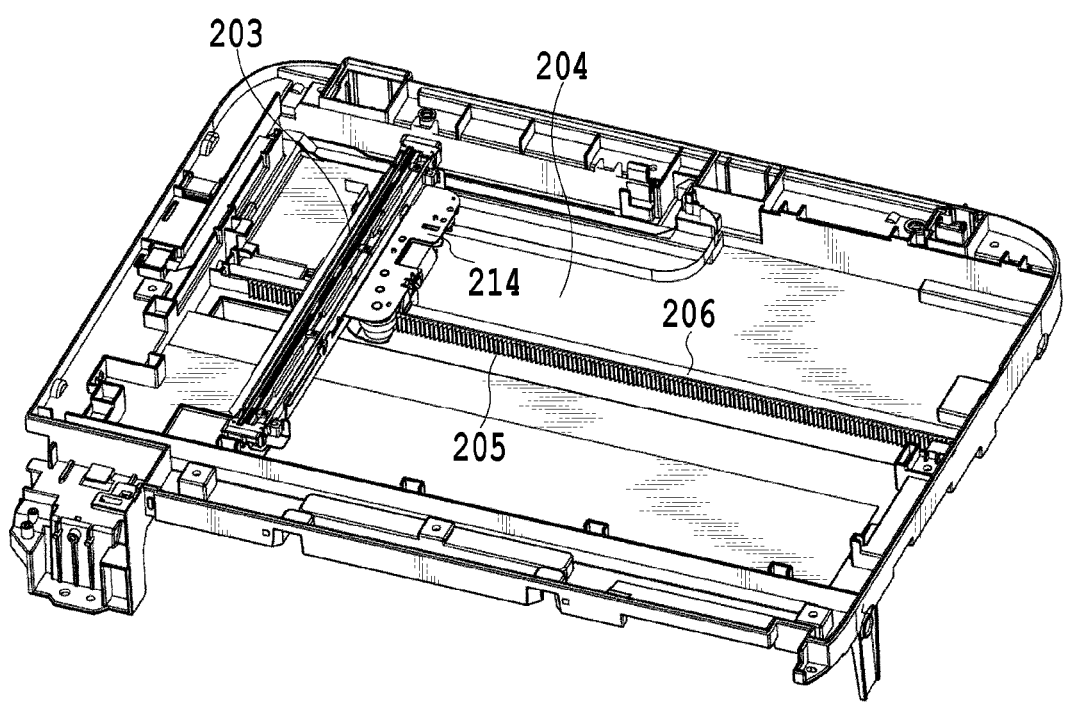
FIG. 3 is a view illustrating the operation of a reading unit in the image reading device according to the embodiment 1 of the present invention.

FIG. 3 is a view illustrating the operation of a reading unit in the FB scanner 200 according to the embodiment 1. As described later with reference to FIG. 7, the reading unit 203 is located below an ADF transparent member (Automatic Document Feeder transparent member) 201 and an FB transparent member (Flatbed transparent member) 202 to be movable during the operation. This allows reading through each individual transparent member.

For the FB reading, the ADF 100 is opened, then a document is laid on the FB transparent member 202, and then the ADF 100 is closed, followed by operation of the start key. Thereupon, the reading unit 203 (sensor unit) reads the stopped document through the FB transparent member 202 while moving in the sub scanning direction which will be described later (performs reading at a first reading part).

For the ADF reading, documents are placed on a feed tray 116 of the ADF 100 without opening the ADF 100, followed by operation of the start key. Thereupon, the reading unit 203 rests and the ADF 100 (document feeding mechanism) feeds the documents one by one onto the ADF transparent member 201. The reading unit 203 reads the incoming document through the ADF transparent member 201 (performs reading at a second reading part), and then the document after the reading is discharged by the ADF 100 to a discharge tray 117.

<Interior Structure of Image Reading Device>

Figure 4:
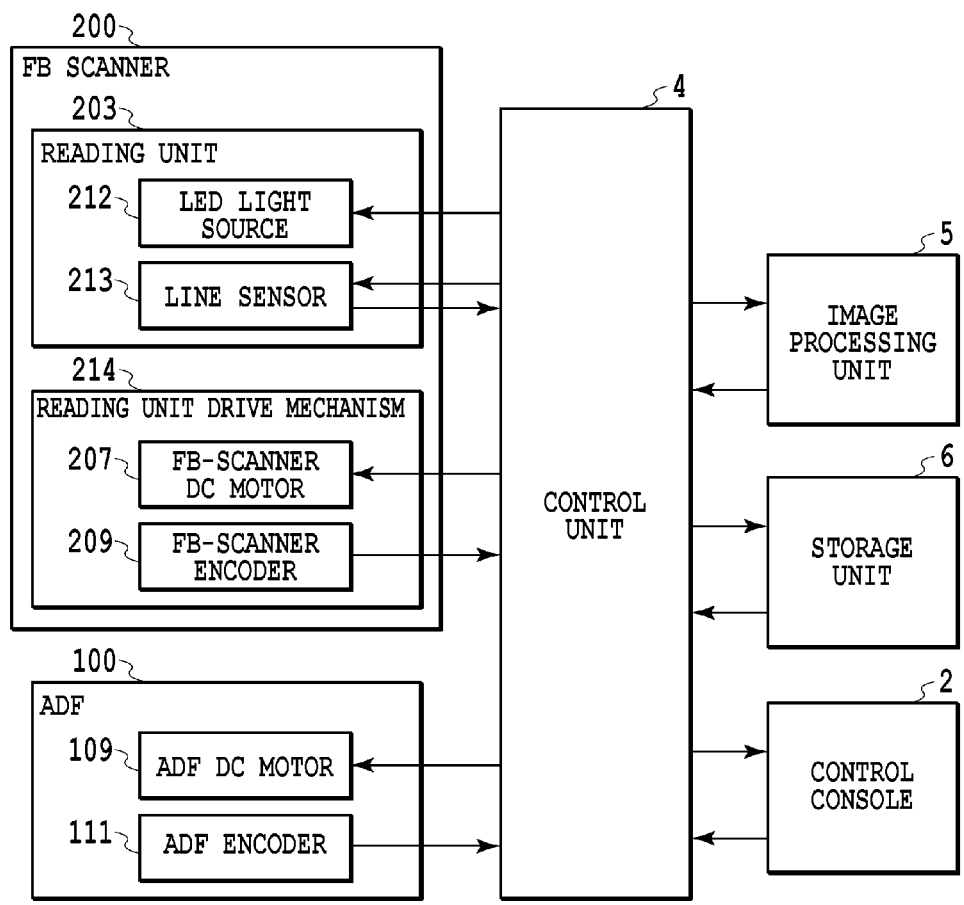
FIG. 4 is a block diagram illustrating the interior structure of the image reading device according to the embodiment 1 of the present invention.

FIG. 4 is a block diagram illustrating the interior structure of the image reading device according to the embodiment 1. The image reading device 1 includes the ADF 100, the FB scanner 200, the control console 2, a control unit 4, an image processing unit 5 and a storage unit 6.

The ADF 100 is controlled by the control unit 4 to feed documents one by one from the feed tray 116 to the ADF transparent member 201, and further discharge it to the discharge tray 117. The FB scanner 200 is controlled by the control unit 4 to drive the reading unit 203 for document reading or calibration. The control console 2 receives user instructions and transmits them to the control unit 4. The control unit 4 receives the user instructions from the control console 2 and controls operation of each unit of the image reading device 1. The image processing unit 5 applies processing, such as gamma correction and the like, to the read image. The storage unit 6 stores various programs executed for control of the control unit 4 and operation of each unit.

The FB scanner 200 includes the reading unit 203 having an LED light source 212 and a line sensor 213, and a reading unit drive mechanism 214 having a DC motor and an encoder. The interior of the FB scanner 200 will be described below in detail.

<FB Scanner>

As illustrated in FIG. 4, the reading unit 203 has the LED light source 212 to apply light to an document, and the line sensor 213 capable of reading a length in the transverse direction or the longitudinal direction of an document. The reading unit 203 can scan in a direction at a right angle to the line direction of the line sensor 213 to read the document. The line direction of the line sensor 213 is referred to as the "main scanning direction", and the moving direction of the reading unit 203 is referred to as the "sub scanning direction". The reading unit 203 uses a unity magnification optical system, called a CIS (Contact Image Sensor).

Figure 5:
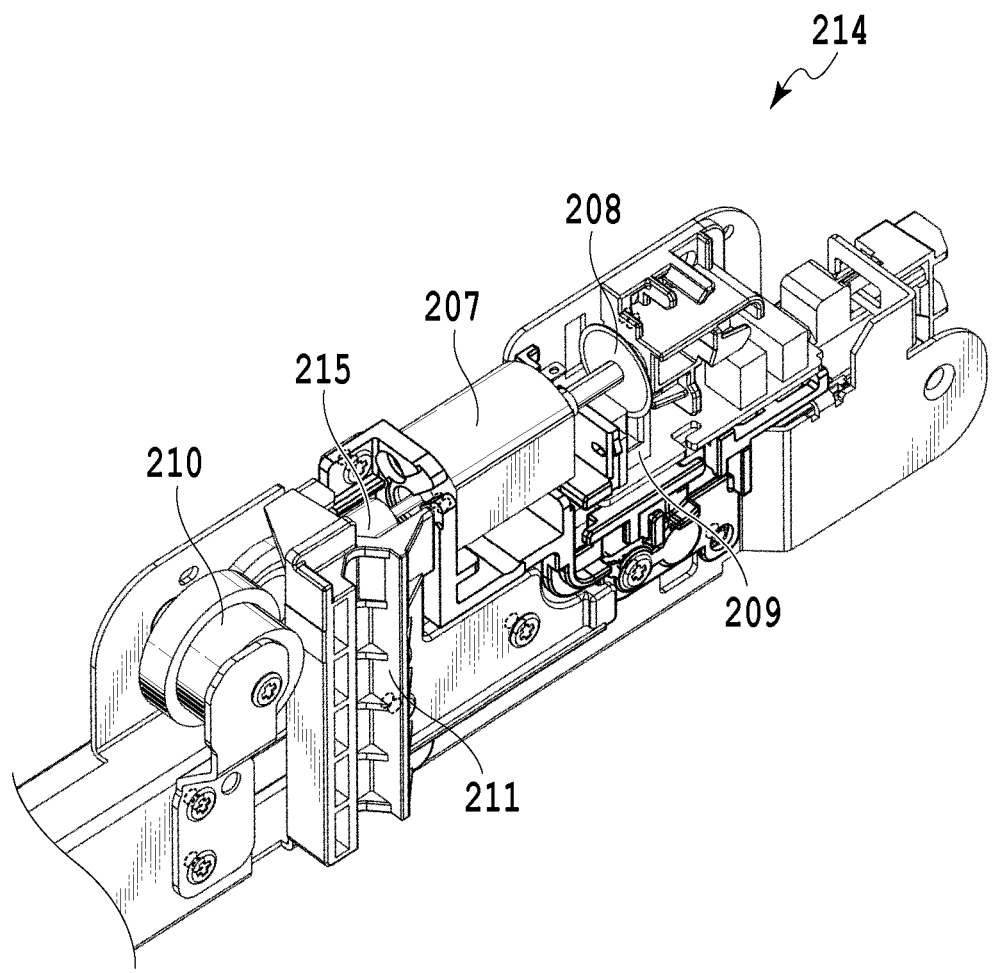
FIG. 5 is a perspective view illustrating the interior of a reading unit drive mechanism in the image reading device according to the embodiment 1 of the present invention.

The reading unit drive mechanism 214 is controlled by the control unit 4 to move the reading unit 203 in the sub scanning direction. FIG. 3 illustrates a scanner base 204, a rack 205 and a guide rail 206 at the time of viewing the reading unit drive mechanism 214 from above. FIG. 5 is a perspective view illustrating the interior of the reading unit drive mechanism 214. The reading unit drive mechanism 214 will be described below in detail with reference to FIG. 3 and FIG. 5.

The reading unit drive mechanism 214 has a DC motor 207 serving as a driving source for the reading unit 203. A worm 215 is press-fitted to the rotating shaft of the DC motor 207. The rotation of the DC motor 207 is transmitted through a drive train to rotate a drive gear 210, thus transmitting the drive force to the rack 205 formed integrally with the scanner base 204. A slider 211 slides along the guide rail 206 to move the reading unit 203 in the sub scanning direction.

The reading unit drive mechanism 214 further has an encoder 209 that outputs pulse signals responsive to the amount of rotation or the amount of displacement for controlling rotation of the DC motor 207. The DC motor 207 is controlled by the PWM (Pulse-Width Modulation) control on the basis of the pulse signals from the encoder 209.

Specifically, a code wheel 208 is press-fitted to the rotating shaft of the DC motor 207 for drive control of the DC motor 207. The code wheel is a member made of a film-form disc with lines printed thereon radially at equal intervals, presence/absence of the regularly-spaced lines being read by the encoder for detection of the amount of rotation of the code wheel. The encoder 209 is mounted in a position suitable for the reading of the code wheel 208. The encoder 209 is able to detect the amount of rotation of the DC motor 207 by reading the lines printed on the code wheel 208 at equal intervals. The result of detection of the encoder 209 is processed by the control unit 4 so that the amount of voltage applied to the DC motor 207 is determined. As a result, the rotation of the DC motor 207 is adjusted to obtain a required speed and position.

The result of the detection of the encoder 209 is also used to produce a reading timing signal for the reading unit 203 in the FB reading. Specifically, the control unit 4 calculates a position of the reading unit 203 on the basis of the result of the detection of the encoder 209, and produces a reading timing signal for the reading unit 203 in accordance with the calculated position of the reading unit 203. This enables a decrease in occurrence of deviation of a reading position by synchronizing the position of the reading unit 203 and the reading timing in the document reading process of the reading unit 203 which is moving in the sub scanning direction.

In the ADF reading, on the other hand, the result of detection of an encoder 111 described later, instead of the result of the detection of the encoder 209, is used to produce a reading timing signal for the reading unit 203. In the ADF reading, the documents are read by the reading unit 203 shared in the FB reading. The reading unit 203 operated in the ADF reading is driven by the reading unit drive mechanism 214 to move to a predetermined position in which the reading unit 203 rests to read the documents fed by the ADF. For this reason, for synchronization between a position of a document midway through the feeding route and the reading timing, the result of the detection of the encoder 111 enabling calculation of a position of the document on the feeding route is used.

<ADF>

Figure 6:
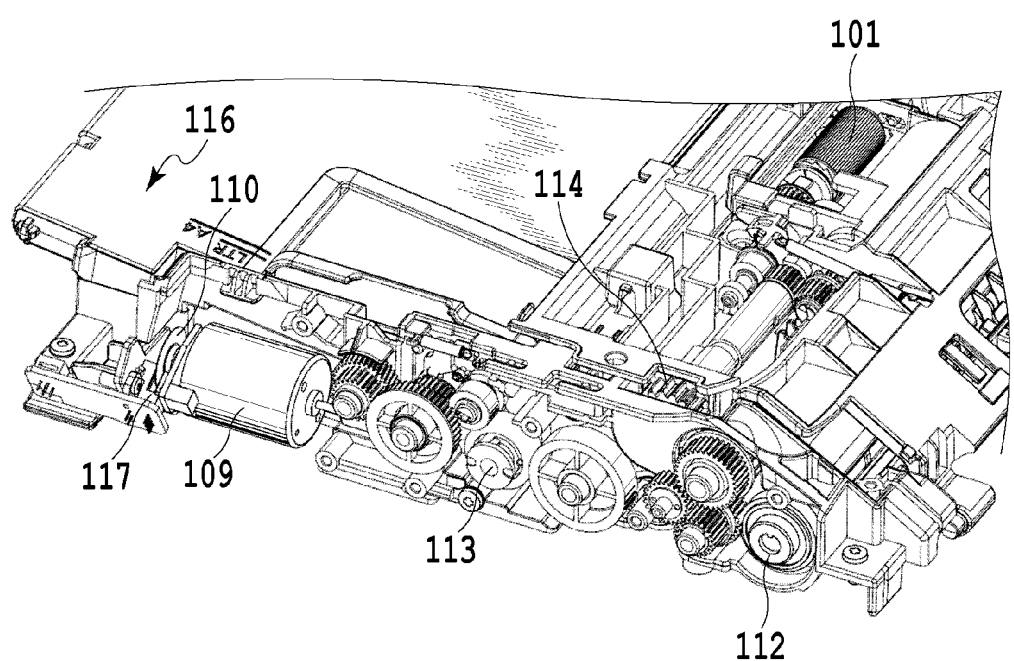
FIG. 6 is a perspective view illustrating the interior of an ADF in the image reading device according to the embodiment 1 of the present invention.
Figure 7:
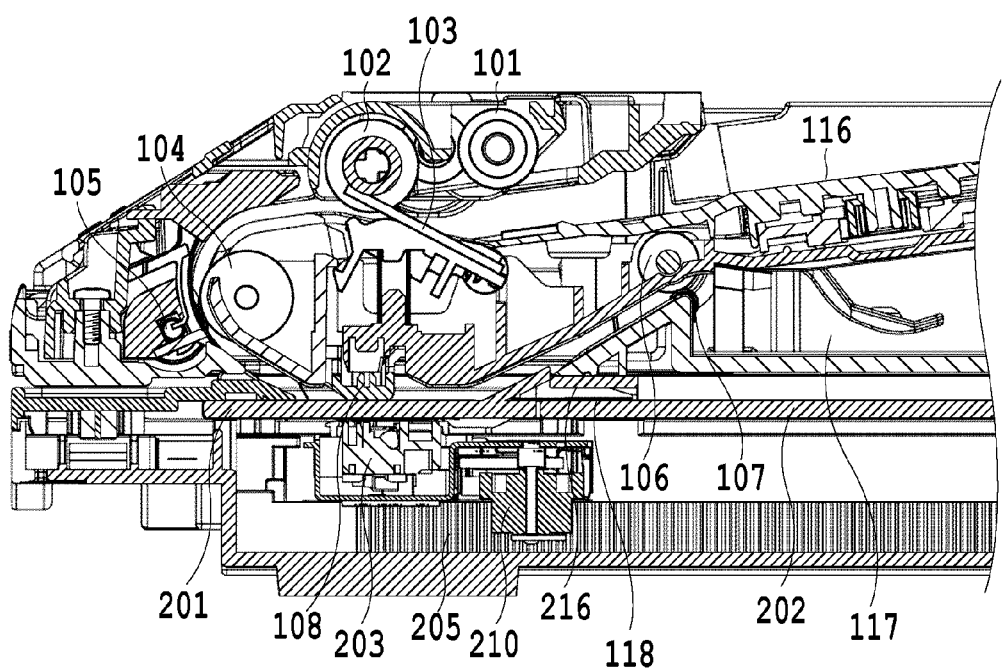
FIG. 7 is a sectional view of an FB scanner and the ADF in the image reading device according to the embodiment 1 of the present invention.

The ADF 100 will be described below in detail. FIG. 6 is a perspective view illustrating the interior of the ADF 100. FIG. 7 is a sectional view of the FB scanner 200 and the ADF 100 taken in the sub scanning direction.

The ADF 100 has a DC motor 109 which is a drive source for feeding documents. The drive power of the DC motor 109 is transferred through the drive train to a pickup roller 101, a separation roller 102, a feed roller 104 and a discharge roller 106. The documents placed on the feed tray 116 are separated one by one by the rotation of the pickup roller 101 and the separation roller 102, and pinched between the feed roller 104 and a feed driven roller 105 to be fed to the ADF transparent member 201 by the rotation of the feed roller 104. Then, each document comes into close contact with the ADF transparent member 201 by a spring-biased white plate 108 so that the reading unit 203 reads the document. By further driving the DC motor 109, the document is pinched between the discharge roller 106 and a discharge driven roller 107 to be discharged to the discharge tray 117 by the rotation of the discharge roller 106.

The ADF 100 further has the encoder 111 outputting pulse signals responsive to the amount of rotation or the amount of displacement for controlling rotation of the DC motor 109. The DC motor 109 is controlled by the PWM (Pulse-Width Modulation) control on the basis of the pulse signals from the encoder 111.

Specifically, a code wheel 110 is press-fitted to the rotating shaft of the DC motor 109 for drive control of the DC motor 109. The encoder 111 is mounted in a position suitable for reading of the code wheel 110. The encoder 111 is able to detect the amount of rotation of the DC motor 109 by reading the lines printed on the code wheel 110 at equal intervals. The result of detection of the encoder 111 is processed by the control unit 4 so that the amount of voltage applied to the DC motor 109 is determined. As a result, the DC motor 109 is adjusted to obtain a required speed and position.

The result of the detection of the encoder 111 is also used to produce a reading timing signal for the reading unit 203 in the ADF reading. Specifically, the control unit 4 calculates a position of the document on the basis of the result of the detection of the encoder 111, and produces a reading timing signal for the reading unit 203 in accordance with the calculated position of the document. This enables a decrease in occurrence of deviation of a reading position by synchronizing the position of the fed document and the reading timing.

<Calibration Process>

An embodiment according to the present invention relates to a mode of performing individual calibration in each of the FB reading and the ADF reading. Specifically, as described earlier, the FB transparent member 202 used in the FB reading and the ADF transparent member 201 used in the ADF reading are formed of different members from each other. Then, the reading unit 203 is operated to perform reading for a color reference sheet through each of the transparent members (performs measurement of a color reference). Based on the read result (measurement result), a calibration is made for the reading unit in each of the FB reading and the ADF reading.

Figure 8:
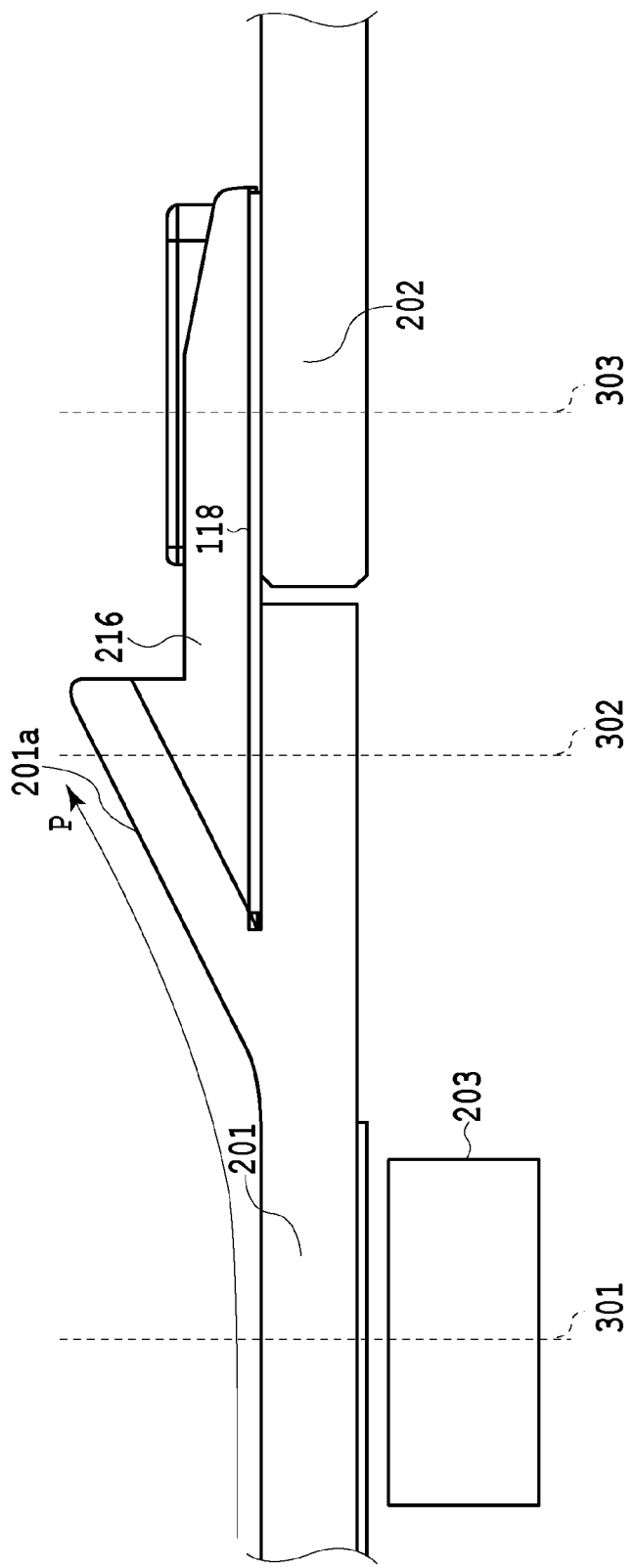
FIG. 8 is a sectional view of a part of the image reading device according to the embodiment 1 of the present invention in the vicinity of an ADF transparent member and an FB transparent member.

Next, the FB transparent member 202 and the ADF transparent member 201 will be described in detail. FIG. 8 is a sectional view of a part of the image reading device according to the embodiment 1 in the vicinity of the ADF transparent member 201 and the FB transparent member 202.

In the embodiment 1, a material of the FB transparent member 202 is glass, while a material of the ADF transparent member 202 is a clear AS resin (acrylonitrile styrene resin). Hard coating is applied to the surface coming into contact with the document to produce increased scratch resistance. Glass and AS resin differ in refractive index from each other. To address this, in addition to the optical characteristics of the reading unit, the ADF transparent member 201 and the FB transparent member 202 are adjusted in thickness in order to bring the read side of the document into focus.

The following describes two advantages in making the ADF transparent member 201 of resin. (1) One of them is a weight reduction because of a small specific gravity, a weight reduction of the device leading to an enhancement in transportability for users and a reduction in transportation cost. (2) The other is shape optimization achieved by integration with peripheral components because of a high thermoplasticity. In the embodiment 1, the ADF transparent member 201 is produced by injection molding and formed integrally with an inclined portion 201a for changing a document feeding direction P to a discharge direction at downstream of the position of ADF reading. By integrally forming the ADF transparent member 201 and the inclined portion 201a in this manner, the boundary of the ADF transparent member 201 and the inclined portion 201a can be formed as a smooth curved surface. As a result, instability of the behavior of the document while passing through can be reduced, thus improving the image quality.

The materials of the FB transparent member 202 and the ADF transparent member 201 are not limited to glass and AS resin. As long as a material to be used has a predetermined light transmissivity or higher, the material is applicable.

As described earlier, the FB transparent member and the ADF transparent member differ in material from each other, so that different color tones are produced. To address this, different calibration processes are performed respectively for the FB reading and the ADF reading to obtain the read image reproduced with the fidelity of color tones to the document respectively in the FB reading and the ADF reading.

For the calibration process in the embodiment 1, the color reference sheet (sheet-shaped member) is mounted in the calibration position, and the reading unit 203 is moved to the calibration position to read the mounted color reference sheet for calibration. In this connection, the calibration position refers to a position where reading for calibration is performed. Because different calibration processes are individually performed for the FB reading and the ADF reading, the color reference sheet is mounted in the separate calibration positions. As illustrated in FIG. 8, the FB calibration position 303 (first position) and the ADF calibration position 302 (second position) are mutually independent.

In the embodiment 1, the calibration position in which the color reference sheet is mounted is different from the position of reading the document (document reading position). This obviates the need for placing the color reference sheet for each calibration and for removing the color reference sheet for each document reading, as compared with the case where the calibration position and the document reading position are the same. The thickness of the ADF transparent member 201 is the same in the ADF reading position 301 and the ADF calibration position 302. This can ensure that the ADF calibration and the ADF reading are performed through the same transparent member. The thickness of the FB transparent member 202 is the same in the FB calibration position 303 and the FB reading position. This can ensure that the FB calibration and the FB reading are performed through the same transparent member.

FIG. 8 also illustrates a color reference sheet 118 used in the calibration process in the embodiment 1. The color reference sheet 118 is formed of a resin-made sheet with known color tones or with a known range of variations of color tones. As illustrated in FIG. 8, the color reference sheet in the FB calibration position 303 (color reference in the first position) and the color reference sheet in the ADF calibration position 302 (color reference in the second position) are formed integrally. Accordingly, the color reference sheet for the FB calibration and the color reference sheet for the ADF calibration can be designed to have approximately equal color tones without the effects of color variations. The case where the color reference sheet for the FB calibration and the color reference sheet for the ADF calibration sheet are integrally formed is described, but not limited thereto. The color reference sheet for the FB calibration and the color reference sheet for the ADF calibration sheet may have the same color reference.

As described in the embodiment 1, when the ADF transparent member 201 is formed integrally with the inclined portion 201a, outside light may possibly affect calibration because above the upper surface of the color reference sheet 118 lies the transparent member. The underside of the color reference sheet 118 may be printed in black in order to reduce the effect of outside light.

<Process Flow of Image Reading Device>

Figure 9:
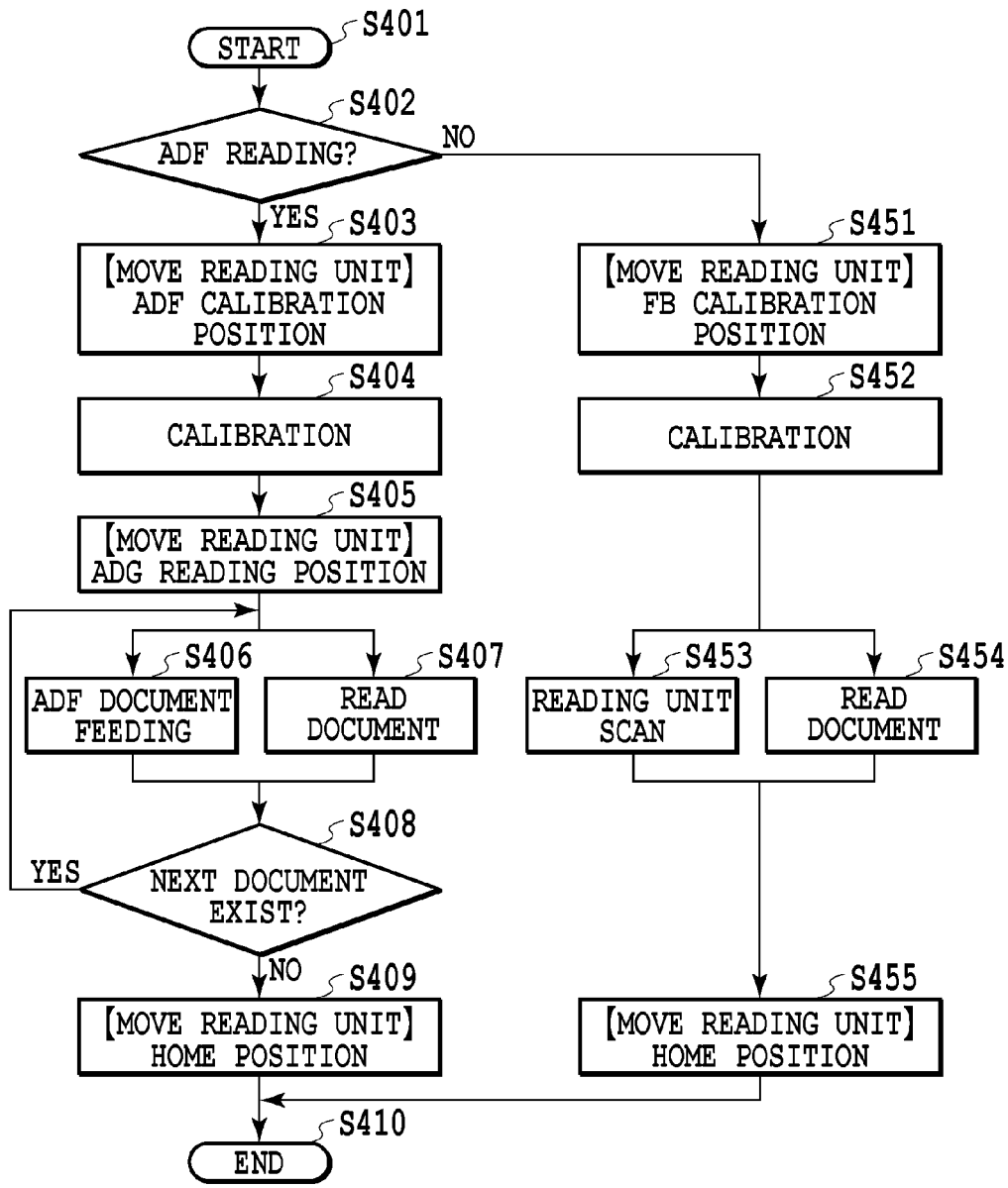
FIG. 9 is a flowchart of the processing of the image reading device according to the embodiment 1 of the present invention.

Next, a process flow of the image reading device according to the embodiment 1 will be described. FIG. 9 is a flowchart of the processing of the image reading device according to the embodiment 1.

At step S401, the control unit 4 receives a reading instruction from the control console 2 for an instruction to start the reading of a document.

At step S402, the control unit 4 determines whether a reading mode is representative of FB reading or ADF reading. The reading mode can be determined by receiving a user selection for the reading mode from the control console 2. Alternatively, a sensor detects documents placed on the ADF feed tray 116, so that it is determined that the reading mode is representative of the ADF reading when the documents are placed, and that it is representative of the FB reading when no document is placed. If the FB reading is determined in step S402, the flow goes to step S451 to perform. the FB reading. On the other hand, if the ADF reading is determined in step S402, the flow goes to step S403 to perform the ADF reading.

At step S451, the reading unit drive mechanism 214 moves the reading unit 203 to the FB calibration position 303.

At step S452, FB-reading calibration is performed. The reading unit 203 reads the color reference sheet 118 through the FB transparent member 202 in the FB calibration position 303, to acquire read data including the color-tone effects of the FB transparent member 202. The control unit 4 uses the read data including the color-tone effects of the FB transparent member 202 to perform the calibration process. This enables the reading unit 203 to perform calibration allowing for the color-tone effects of the FB transparent member 202.

The FB-reading calibration will be described below in details. Initially, compensation is made for variations in characteristics of the LED light source 212 (illumination means) which is a light source of the reading unit 203. The FB scanner 200 gradually changes the output or time of the LED light source 212 for light emission, and reads at the line sensor 213 the light reflected from the color reference sheet 118. Then, the FB scanner 200 adjusts the output or time of the LED light source 212 to obtain a proper quantity of light. Next, compensation is made for variations in characteristics (sensitivity) of the line sensor 213 (imaging means) of the reading unit 203. The FB scanner 200 regards output of the line sensor 213 when the LED light source 212 emits light in the proper quantity of light as white reference data, and regards output of the line sensor 213 when the LED light source 212 is turned off as black reference data. Interpolations are made by using tone curves preset with reference to the two sets of data so as to adjust the output of the line sensor 213 to become accurate and uniform in the main scanning direction.

It should be noted that, in order to average variations in color tones resulting from the surface conditions of the color reference sheet 118, read data can be acquired over a plurality of times while the reading unit 203 is being moved, and the averaged read data can be used to perform the calibration process.

Then, in step S453 and step S454, the FB reading is performed. In step S453, the reading unit 203 is driven at a speed determined in accordance with the reading mode in the sub scanning direction, and simultaneously, in step S454, the reading unit 203 is operated to read an image in a designated range. After the completion of the reading, the flow goes to step S455.

In step S455, the reading unit drive mechanism 214 moves the reading unit 203 to its home position, completing the reading operation.

On the other hand, if the ADF reading is determined in step S402, the flow goes to step S403. In step S403, the reading unit drive mechanism 214 moves the reading unit 203 to the ADF calibration position 302.

In step S404, ADF-reading calibration is performed. The reading unit 203 reads the color reference sheet 118 through the ADF transparent member 201 in the ADF calibration position 302, to acquire read data including the color-tone effects of the ADF transparent member 201. The control unit 4 uses the read data including the color-tone effects of the ADF transparent member 201 to perform the calibration process. This enables the reading unit 203 to perform calibration allowing for the color-tone effects of the ADF transparent member 201. The ADF-reading calibration process is similar to the FB-reading calibration process, thus omitting the detailed description.

Subsequent to that, in step S405, the reading unit drive mechanism 214 moves the reading unit 203 to the ADF reading position 301.

Then, in step S406, step S407 and step S408, the ADF reading is performed. In step S406 a document is fed at a speed determined in accordance with the reading mode, and simultaneously, in step S407 image reading is performed. After the completion of the reading of a sheet of the document, if it is determined in step S408 that the next sheet of the document exists, the processes in step S406 and step S407 are repeated. If it is determined in step S408 that no sheet of the document exists, the flow goes to step S409.

In step S409, the reading unit drive mechanism 214 moves the reading unit 203 to its home position, and then in step S410 the reading operation is completed.

In consequence, the mutually independent calibrations for the FB reading and the ADF reading are able to be performed respectively through the FB transparent member and the ADF transparent member. Because of this, in each of the FB reading and the ADF reading, the read image reproduced with the fidelity of color tones to a target document is obtained. Also, when the same document is read, a reduction in the difference in color tones between the FB read image and the ADF read image can be achieved.

In the embodiment 1 the FB transparent member is made of glass and the ADF transparent member is made of AS resin, but an advantageous effect of the present invention is not limited to this combination. For example, even if both of the FB transparent member and the ADF transparent member are of glass, the precisely identical color tones are not produced due to differences in manufacturer, time of manufacture, years of service, thickness and the like. Therefore, even if the materials of the FB transparent member and the ADF transparent member are the same or different, the advantageous effects of the present invention can be produced. In other words, if the ADF transparent member and the FB transparent member are separate members (different members), the present invention is applicable. In this regard, "the separate members (different members)" include one differing in materials and one physically separated.

A description is given of embodiment 2 including a reverse-side reading unit for reading the reverse side of a document fed by the ADF 100 in addition to the structure according to the embodiment 1. The description on the same structure and processing as those in the embodiment 1 is omitted.

Figure 10:
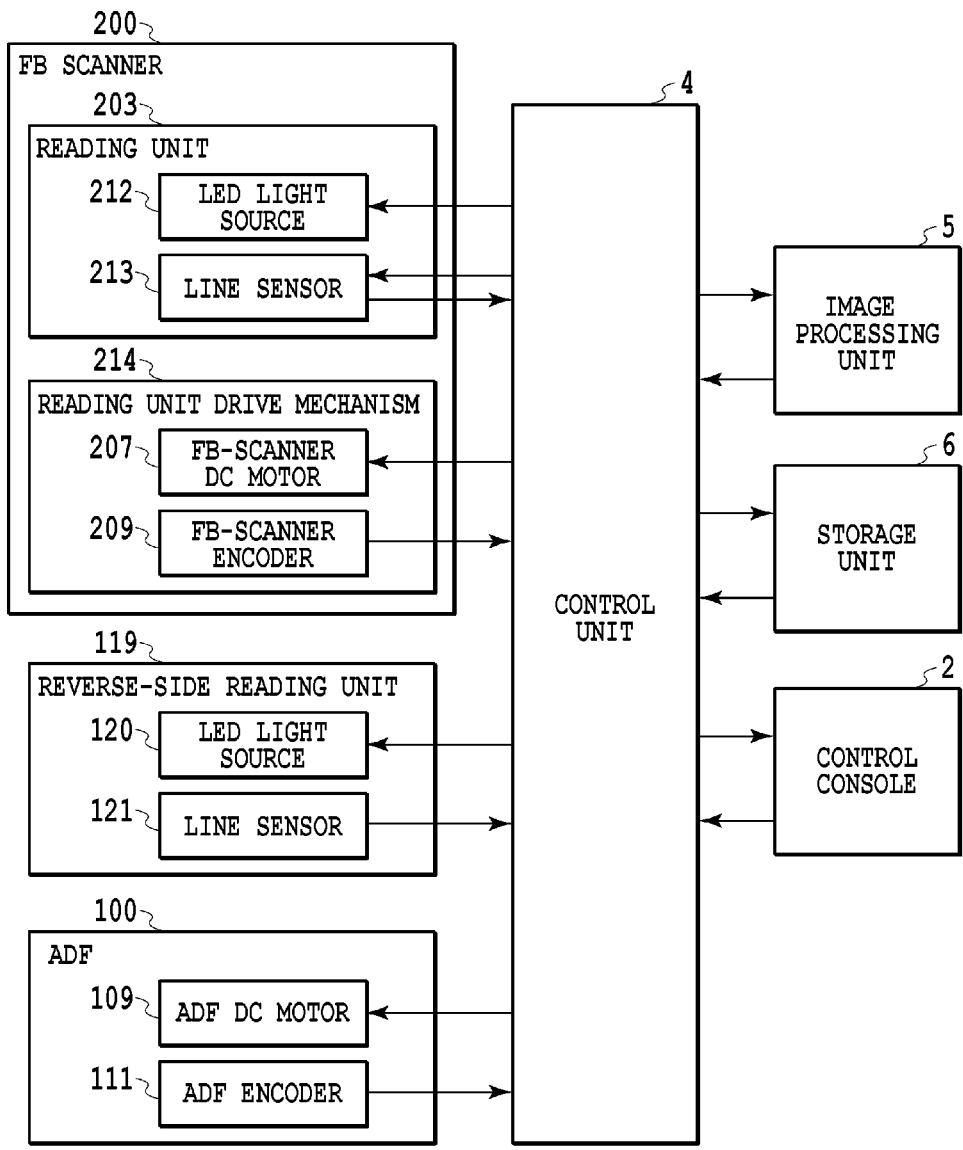
FIG. 10 is a block diagram illustrating the interior structure of an image reading device according to the embodiment 2 of the present invention.

FIG. 10 is a block diagram illustrating the interior structure of an image reading device according to the embodiment 2. The interior structure of the image reading device of the embodiment 2 is similar to that of the image reading device 1 of the embodiment 1, but further includes a reverse-side reading unit 119 (reverse-side sensor unit).

Figure 11:
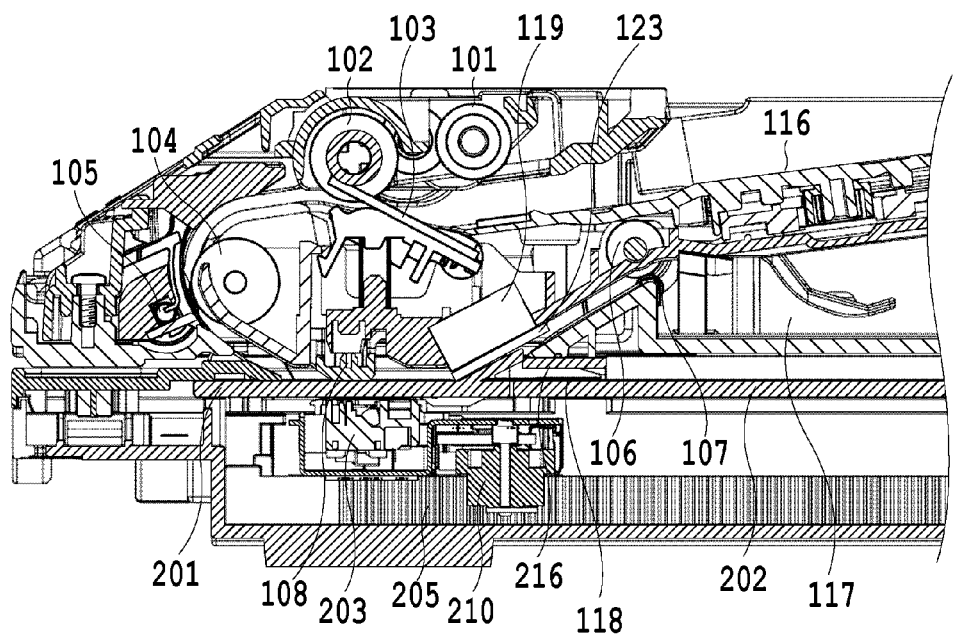
FIG. 11 is a sectional view of an FB scanner and an ADF in the image reading device according to the embodiment 2 of the present invention.

FIG. 11 is a sectional view of the FB scanner 200, the ADF 100, the reading unit 203 and the reverse-side reading unit 119 taken in the sub scanning direction. As illustrated in FIG. 11, the reverse-side reading unit 119 is located downstream of the reading unit 203 in the document feeding direction. In the embodiment 2, the reading unit 203 is located downward of the document feeding route so as to read the front side of the incoming document through the ADF transparent member 201. The reverse-side reading unit 119 is located upward of the document feeding route so as to read the reverse side of the incoming document through a reverse-side ADF transparent member 123 (performs reading at a third reading part). The reverse-side reading unit 119 has a reverse-side LED light source 120 and a reverse-side line sensor 121, and uses a CIS (Contact Image Sensor) of a unity magnification optical system, similarly to the reading unit 203.

A reading timing signal for the reverse-side reading unit 119 (reverse-side CIS) is generated by use of a signal of the encoder 111 as in the case of generating a reading timing signal for the reading unit 203 operated in the ADF reading. Specifically, the control unit 4 calculates a position of the document on the basis of the amount of rotation of the DC motor 109 detected by the encoder 111, and generates a reading timing signal for the reverse-side reading unit 119 in accordance with the detected position of the document. This enables a decrease in occurrence of deviation of a reading position by synchronizing the position of the fed document and the reading timing.

In the embodiment 2, the FB transparent member 202, the ADF transparent member 201 and the reverse-side ADF transparent member 123 are formed of different members, differing in color tones from each other. In order to obtain the read image reproduced with the fidelity of color tones to the document, different calibration processes are required for the FB reading, the ADF reading, and the reverse-side ADF reading.

Figure 12:
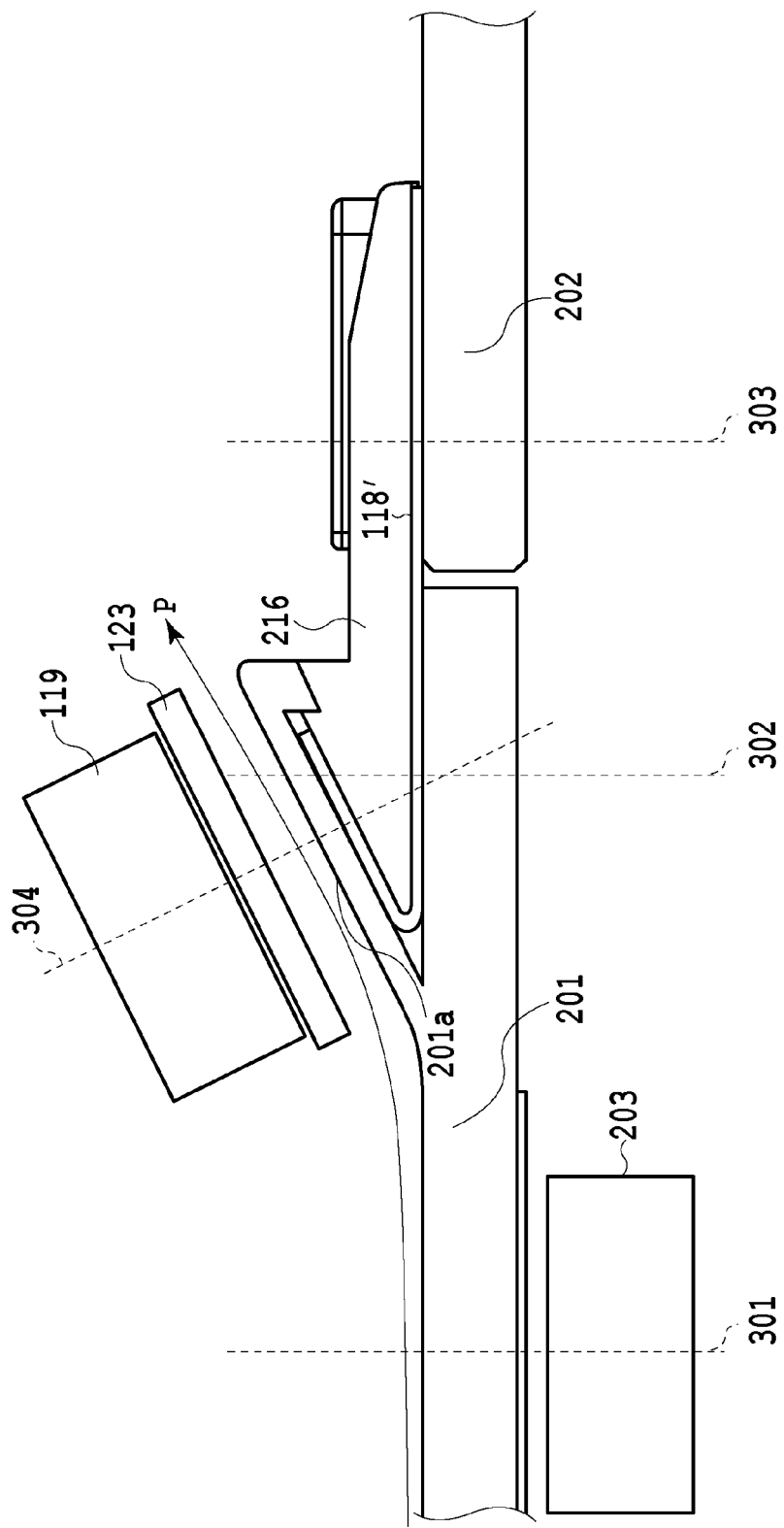
FIG. 12 is a sectional view of a part of the image reading device according to the embodiment 2 of the present invention in the vicinity of an ADF transparent member, a reverse-side ADF transparent member and an FB transparent member in the image reading device according to the embodiment 2 of the present invention.

FIG. 12 is a sectional view of a part of the image reading device according to the embodiment 2 in the vicinity of the ADF transparent member 201, the reverse-side ADF transparent member 123 and the FB transparent member 202. A difference from the embodiment 1 is that a color reference sheet (color reference sheet 118') for the reverse-side ADF reading is also placed between the inclined portion 201a of the ADF transparent member and a document holder 216. The color reference sheet in the FB calibration position 303, the color reference sheet in the ADF calibration position 302, and the color reference sheet in the reverse-side ADF calibration position 304 (a color reference in a third position) are formed integrally. Accordingly, the color reference sheet for the FB calibration, the color reference sheet for the ADF calibration, and the color reference sheet for the reverse-side ADF calibration can be designed to have approximately equal color tones without the effects of color variations.

The calibration process for the FB reading and the calibration process for the ADF reading are similar to those in the embodiment 1, and the description is omitted. The following is a description on the details of a calibration (reverse-side reading unit calibration) process for the reverse-side ADF reading.

In the embodiment 2, the reverse-side ADF reading and the calibration for the reverse-side ADF reading are performed in the same position. That is, the reverse-side reading position and the reverse-side ADF calibration position 304 are the same. This obviates the need for moving the reverse-side reading unit 119 before the reverse-side ADF reading calibration and the reverse-side ADF reading, so that the reverse-side reading unit 119 may be mounted in the reverse-side ADF calibration position 304.

For the reverse-side ADF calibration, the reverse-side reading unit 119 reads the color reference sheet 118' in the reverse-side ADF calibration position 304 through the reverse-side ADF transparent member 123 and the inclined portion 201a laid on the color reference sheet 118'. Through this reading, the reverse-side reading unit 119 acquires read data including the color-tone effects of the reverse-side ADF transparent member 123 and the inclined portion 201a. On the other hand, for the reverse-side ADF reading in the reverse-side reading unit process, the reverse-side reading unit 119 reads the incoming document through the reverse-side ADF transparent member 123. If the read data including the color-tone effects of the reverse-side ADF transparent member 123 and the inclined portion 201a is used to perform the calibration process for the reverse-side ADF reading, a color correction suitable for the reverse-side ADF reading is made impractical by the color-tone effects of the inclined portion 201a.

In the embodiment 2, the control unit 4 acquires and holds data on color tones of the inclined portion 201a in advance. The control unit 4 uses the read data including the color-tone effects of the reverse-side ADF transparent member 123 and the inclined portion 201a read by the reverse-side reading unit 119, and the holding color data of the inclined portion 201a, to perform the calibration process for the reverse-side ADF reading.

The data on the color tones of the inclined portion 201a is able to be periodically acquired or updated by the following technique. In particular, this technique is desirably used when the device is not operated for a long time. The reverse-side reading unit 119 reads the color reference sheet 118' in the reverse-side ADF calibration position 304 opposite to the inclined portion 201a for acquisition of read data A+B including the color-tone effects of the reverse-side ADF transparent member 123 and the inclined portion 201a. At this time, the reading unit 203 is moved to the ADF calibration position 302 such that the reading unit 203 is operated to acquire read data C including the color-tone effects of the ADF transparent member 201 at the same time. Then, a sheet of white paper with front and reverse sides of the same color tone is passed in order to cause the reading unit 203 to acquire front-side data C+α of the white paper in the ADF reading position 301 and cause the reverse-side reading unit 119 to acquire reverse-side data A+α of the white paper in the reverse-side ADF calibration position 304. After the read data has been acquired, first, data a is calculated from a difference between the read data C and the read data C+α acquired from the same reading unit 203 and the ADF transparent member 201. As a result, a difference in color tones between the color reference sheet 118' and the white paper is clearly determined as data a. Then, from the difference between the read data A+α and the data a, data A including the color-tone effects of the reverse-side ADF transparent member 123 is calculated. Further, from the difference between the read data A+B and the data A, data B on the color tones of the inclined portion 201a can be calculated. In this manner, using the color-tone data of the inclined portion 201a acquired or updated by the above technique allows the reverse-side reading unit 119 to obtain the read image reproduced with the fidelity of color tones to the document. It should be noted that the example provides just a simple calculation example for a conceptual description. Accordingly, a complicated mathematical expression such as using multiplication of a coefficient may be used to acquire more optimal data.

Figure 13B:
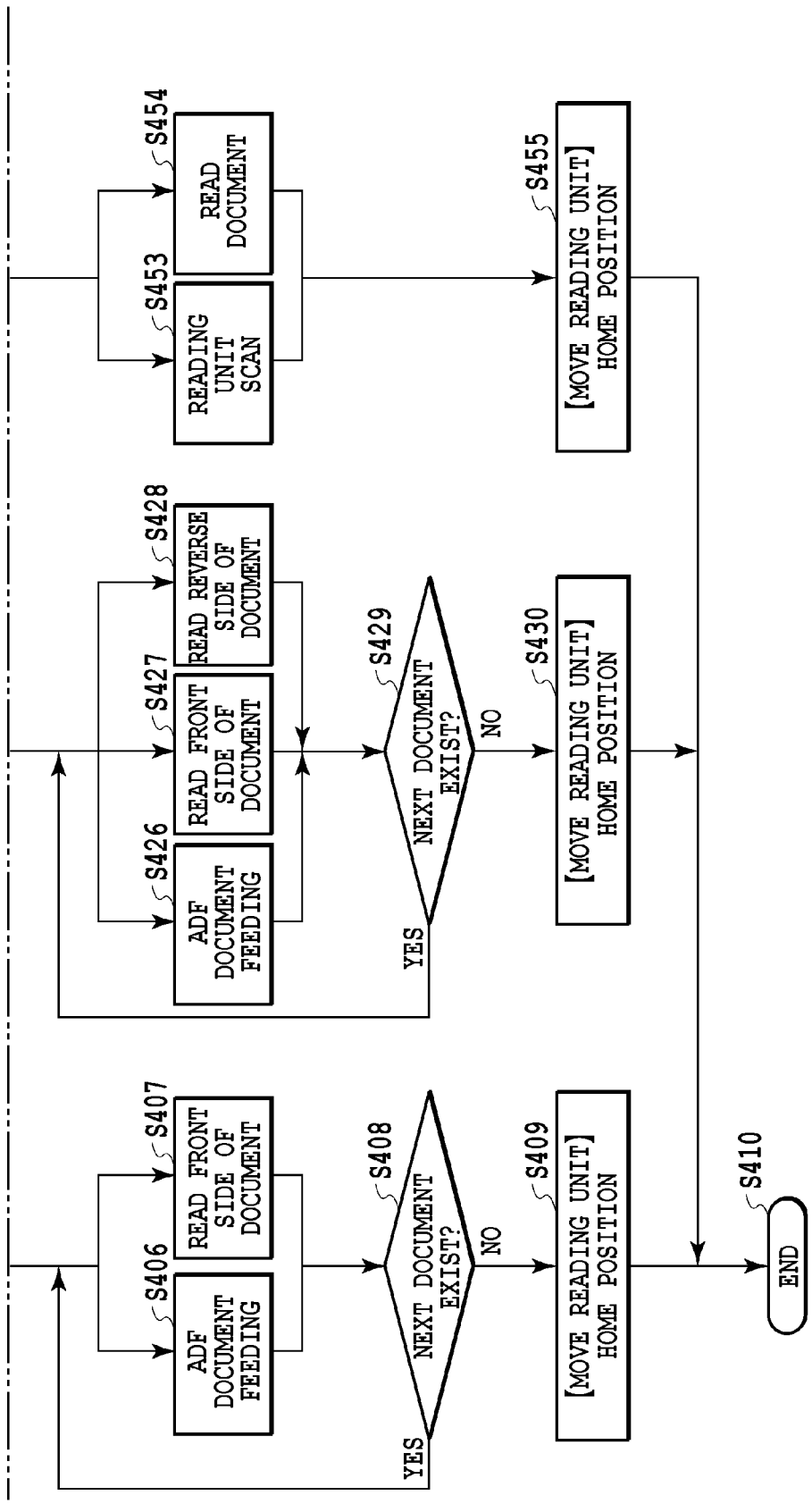

Next, the processing flow of the image reading device according to the embodiment 2 will be described. FIG. 13 is a flowchart illustrating the processing of the image reading device according to the embodiment. The image reading operations in the FB reading and the ADF reading are similar to those in the embodiment 1. Only the operation in the double-side ADF reading is described.

When ADF double-side reading is selected, the control unit 4 determines in step S421 that the double-side reading of ADF is selected.

In step S422, the reading unit drive mechanism 214 moves the reading unit 203 to the ADF calibration position 302.

In step S423, the front-side ADF reading calibration is performed. The ADF reading calibration process in step S423 is similar to the process in step S404, and therefore a description on it is omitted.

In step S424, the reverse-side ADF reading calibration is performed. The reverse-side reading unit 119 reads the color reference sheet 118' through the reverse-side ADF transparent member 123 and the inclined portion 201a in the reverse-side ADF calibration position 304, to acquire read data including color-tone effects of the reverse-side ADF transparent member 123 and the inclined portion 201a. The control unit 4 performs the calibration process by use of read data including the color-tone effects of the reverse-side ADF transparent member 123 and the inclined portion 201a, and pre-stored data on color tones of the inclined portion 201a. This enables the reverse-side reading unit 119 to perform calibration allowing for the color-tone effects of the reverse-side ADF transparent member 123 and the inclined portion 201a.

Subsequent to that, in step S425, the reading unit drive mechanism 214 moves the read unit 203 to the front-side ADF reading position 301.

From step S426 to step S429, the front-side ADF reading and the reverse-side ADF reading are performed. In step S426, a document is fed at a speed determined in accordance with the reading mode, and simultaneously, in step S427 the front-side document reading is performed and in step S428 the reverse-side document reading is performed. After the completion of the reading of a sheet of the document, if it is determined in step S429 that the next sheet of the document exists, the processes in step S426, step S427 and step S428 are repeated. If it is determined in step S429 that no sheet of the document exists, the flow goes to step S430.

In step S430, the reading unit drive mechanism 214 moves the reading unit 203 to its home position, completing the reading operation.

Thus, since the calibration for the FB reading, the front-side ADF reading and the reverse-side ADF reading is able to be performed through the respective transparent members, when the same document is read, a reduction in the difference in color tones between the FB read image and the ADF read image can be achieved. Also, a reduction in the difference in color tones between the reverse-side ADF read image and the front-side ADF read image can be achieved.

In the embodiment, the calibration for the reverse-side ADF reading is performed by use of the pre-stored color-tone data of the inclined portion 201a, but if the color-tone effects of the inclined portion 201a can be eliminated, other methods may be adopted. For example, a rectangular-shaped hole may be formed in the inclined portion 201a with respect to the reverse-side ADF calibration position 304. As a result, in the reverse-side ADF calibration, the reverse-side reading unit 119 can read the color reference sheet 118' through only the reverse-side ADF transparent member 123 in the reverse-side ADF calibration position 304. Thus, read data including the color-tone effects of the reverse-side ADF transparent member 123 but no color-tone effect of the inclined portion 201a is acquired. The control unit 4 can use the acquired read data to perform the calibration process for the reverse-side ADF reading.

The present invention is also attained by executing the following processing. Specifically, the processing is executed by supplying software (program) implementing the functions of the aforementioned embodiments to a system or a device through a network or various types of storage media and causing a computer (or CPU, MPU or the like) of the system or the device to read the program for execution.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2013-173385 filed on Aug. 23, 2013, which is hereby incorporated by reference herein in its entirety.

What is claimed is:

1. An image reading device, comprising:
   a sensor unit;
   a first reading part at which the sensor unit reads a document through a first transparent member;

a second reading part at which the sensor unit reads a document through a second transparent member different from the first transparent member; and
a color reference, wherein measurement of the color reference is able to be performed through the first transparent member by the sensor unit for calibration for reading at the first reading part, and measurement of the color reference is able to be performed through the second transparent member by the sensor unit for calibration for reading at the second reading part, and
wherein a first position in which the measurement of the color reference is performed for calibration for reading at the first reading part is different from a second position in which the measurement of the color reference is performed for calibration for reading at the second reading part.

2. The image reading device according to claim 1, wherein the sensor unit is positioned at the first position when the measurement of the color reference is performed for calibration for reading at the first reading part and the sensor unit is positioned at the second position when the measurement of the color reference is performed for calibration for reading at the second reading part.

3. The image reading device according to claim 1, wherein the color reference in the first position and the color reference in the second position are integrally formed of a sheet-shaped member.

4. The image reading device according to claim 1, wherein
a position in which reading at the first reading part is performed is different from the first position, and
a position in which reading at the second reading part is performed is different from the second position.

5. The image reading device according to claim 4, wherein
the first transparent member has the same thickness in the position in which the reading at the first reading part is performed and the first position, and
the second transparent member has the same thickness in the position in which the reading at the second reading position is performed and the second position.

6. The image reading device according to claim 1, wherein the first transparent member is made of glass and the second transparent member is made of resin.

7. The image reading device according to claim 1, wherein
the sensor unit reads a document fed to the second transparent member by a document feeding mechanism at the second reading part, and
the second transparent member is formed integrally with an inclined portion for changing a document feeding direction to a discharge direction downstream of the position in which reading is performed at the second reading part.

8. An image reading device comprising:
a sensor unit;
a reverse-side sensor unit;
a first reading part at which the sensor unit reads a document through a first transparent member;
a second reading part at which the sensor unit reads a document through a second transparent member different from the first transparent member;
a third reading part at which the reverse-side sensor unit reads a reverse side of a document through a third transparent member different from the first transparent member and the second transparent member, and
a color reference,
wherein measurement of the color reference is able to be performed through the first transparent member by the sensor unit for calibration for reading at the first reading part, and measurement of the color reference is able to be performed through the second transparent member by the sensor unit for calibration for reading at the second reading part, and
wherein the reverse-side sensor unit is controlled to measure the color reference for calibration for reading at the third reading part.

9. The image reading device according to claim 8, wherein a third position in which the measurement of the color reference is performed for calibration for reading at the third reading part is the same as a position in which reading is performed at the third reading part.

10. The image reading device according to claim 9, wherein the color reference in the first position in which measurement of the color reference is performed for the calibration for reading at the first reading part, the color reference in the second position in which measurement of the color reference is performed for the calibration for reading at the second reading part, and the color reference in the third position are integrally formed of a sheet-shaped member.

11. The image reading device according to claim 9, wherein
the sensor unit reads a front side of a document fed to the second transparent member by a document feeding mechanism at the second reading part,
the third position is opposite to the inclined portion for changing a document feeding direction to a discharge direction downstream of the position in which reading is performed at the second reading part, and
the color reference in the third position and the third transparent member are located on the opposite sides of the inclined portion.

12. The image reading device according to claim 11, wherein
a hole is formed in the inclined portion with respect to the third position, and
the calibration for reading at the third reading part is performed on the basis of data obtained by measuring the color reference through the third transparent member in the third position.

13. The image reading device according to claim 11, wherein the calibration for reading at the third reading part is performed on the basis of data obtained by measuring the color reference through the third transparent member and the inclined portion in the third position, and data on color tones of the inclined portion.

14. The image reading device according to claim 1, further comprising an image printing unit.

15. An image reading method that operates a sensor unit to perform first reading through a first transparent member to read a document on the first transparent member, and second reading through a second transparent member different from the first transparent member to read a document fed to the second transparent member, wherein the method includes:
causing the sensor unit to read a color reference through the first transparent member at a first position to perform calibration for the first reading; and
causing the sensor unit to read the color reference through the second transparent member at a second position which is different from the first position to perform calibration for the second reading.

16. An image reading method that operates a sensor unit to perform first reading through a first transparent member to read a document on the first transparent member, and second reading through a second transparent member different from the first transparent member to read a document fed to the second transparent member, wherein the method comprises:

moving the sensor unit to a first position to perform calibration for the first reading and causing the sensor unit to read a color reference through the first transparent member; and moving the sensor unit to a second position which is different from the first position to perform calibration for the second reading and causing the sensor unit to read the color reference through the second transparent member.

* * * * *